United States Patent

Oishi

(10) Patent No.: US 9,319,680 B2
(45) Date of Patent: Apr. 19, 2016

(54) IMAGE ENCODING APPARATUS AND ITS CONTROL METHOD

(71) Applicant: CANON KABUSHIKI KAISHA, Tokyo (JP)

(72) Inventor: Akihiro Oishi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 392 days.

(21) Appl. No.: 13/909,595

(22) Filed: Jun. 4, 2013

(65) Prior Publication Data

US 2013/0343449 A1    Dec. 26, 2013

(30) Foreign Application Priority Data

Jun. 20, 2012  (JP) .................................. 2012-138666

(51) Int. Cl.

| H04N 7/12 | (2006.01) |
|---|---|
| H04N 19/50 | (2014.01) |
| H04N 19/176 | (2014.01) |
| H04N 19/119 | (2014.01) |
| H04N 19/147 | (2014.01) |
| H04N 19/149 | (2014.01) |
| H04N 19/126 | (2014.01) |
| H04N 19/115 | (2014.01) |

(52) U.S. Cl.
CPC ....... *H04N 19/00569* (2013.01); *H04N 19/119* (2014.11); *H04N 19/126* (2014.11); *H04N 19/147* (2014.11); *H04N 19/149* (2014.11); *H04N 19/176* (2014.11); *H04N 19/115* (2014.11)

(58) Field of Classification Search
USPC .................................................. 375/240.03
See application file for complete search history.

(56) References Cited

U.S. PATENT DOCUMENTS

| 6,243,417 B1 * | 6/2001 | Obikane ............ H04N 21/2365 375/240.03 |
|---|---|---|
| 6,792,157 B1 * | 9/2004 | Koshi ..................... H04N 19/46 341/106 |
| 2008/0025396 A1 * | 1/2008 | Tasaka ................. H04N 19/172 375/240.12 |
| 2008/0146215 A1 * | 6/2008 | Oota ..................... H04L 1/0017 455/422.1 |

FOREIGN PATENT DOCUMENTS

| JP | 09-130801 A | 5/1997 |
|---|---|---|
| JP | 09-284769 A | 10/1997 |
| JP | 2001-204028 A | 7/2001 |
| JP | 2006-254370 A | 9/2006 |
| JP | 2012-080212 A | 4/2012 |

OTHER PUBLICATIONS

Feb. 16, 2016 Japanese Office Action, issued in Japanese Patent Application No. 2012138666.

* cited by examiner

*Primary Examiner* — Tracy Li
(74) *Attorney, Agent, or Firm* — Cowan, Liebowitz & Latman, P.C.

(57) ABSTRACT

An image encoding apparatus for encoding image data including a plurality of frames, determines an encoding block size of an encoding subject frame of the image data based on the obtained image data, encodes the obtained image data on an encoding block unit basis in accordance with the determined encoding block size, controls a code amount of the size-decided encoding block based on encoding information regarding the current size-decided encoding block and the encoding block encoded before the current encoding block, operates predetermined encoding information of the encoding subject frame based on the encoding information, and restricts the encoding block size to be determined, in accordance with the operated predetermined encoding information.

18 Claims, 7 Drawing Sheets

FIG. 2

IMAGE ENCODING APPARATUS AND ITS CONTROL METHOD

BACKGROUND OF THE INVENTION

1. Field of the Invention

The present invention relates to an image encoding apparatus and, more particularly, to an image encoding apparatus for encoding an image on a divided block unit basis and a control method of such an image encoding apparatus.

2. Description of the Related Art

In the related arts, a digital video camera is well-known as a camera-integrated moving image recording apparatus for compression encoding and recording moving image data which is obtained by photographing an object. In recent years, a recording medium for recording moving image data has been changing from a magnetic tape in the related art to a disk-type medium, a semiconductor memory, or the like having high convenience such as random access performance or the like. As a compression method, an MPEG2 method which is capable of achieving a compression at a high compression rate by using a motion prediction between frames is generally used. Further, in recent years, an H.264 method which is capable of achieving a compression at a higher compression rate is used. In the H.264 method or the like, such a standard that a macro block is finely divided into sub macro blocks and a motion compensation can be performed has been defined.

Therefore, a method of adaptively determining a block size which is to be used, in accordance with a feature or the like of an image has been disclosed in the Japanese Patent Application Laid-Open No. H09-130801 (Patent Literature 1). A method of adaptively determining a block size in accordance with camera information has been disclosed in the Japanese Patent Application Laid-Open No. 2006-254370 (Patent Literature 2).

However, in an encoding method of the next generation whose standardization has been being progressed in recent years, a method whereby a size of encoding block to which a quantization coefficient of an image is decided can be adaptively changed is being examined.

If the encoding block size is adaptively changed, a block division can be performed in accordance with a feature or the like of an image and an encoding efficiency and picture quality can be improved.

However, since the quantization coefficient can be determined every encoding block size, a code amount error serving as a difference between a target code amount and a generated code amount of each block increases, so that a deterioration in picture quality is caused.

SUMMARY OF THE INVENTION

In consideration of the foregoing problems in the related arts as mentioned above, it is an aspect of the invention to provide an image encoding apparatus in which a maximum size of an encoding block is determined in accordance with an encoding position or a generated code amount and a code amount error is suppressed, thereby making optimum quantization control and enabling a good image to be obtained.

According to an aspect of the invention, an image encoding apparatus for encoding image data including a plurality of frames, determines an encoding block size of an encoding subject frame of the image data on the basis of the obtained image data, encodes the obtained image data on an encoding block unit basis in accordance with the determined encoding block size, controls a code amount of the encoding block the size of which is determined based on encoding information regarding the current encoding block the size of which is determined and the encoding block encoded before the current encoding block, arithmetically operates predetermined encoding information of the encoding subject frame on the basis of the encoding information, and restricts the encoding block size which is to be determined, in accordance with the predetermined encoding information which is arithmetically operated.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a diagram illustrating an example in which an image is divided into blocks on an encoding unit basis by the block serving as a largest encoding unit.

DESCRIPTION OF THE EMBODIMENTS

Various exemplary embodiments, features, and aspects of the present invention will be described in detail below with reference to the drawings.

Figure 1:
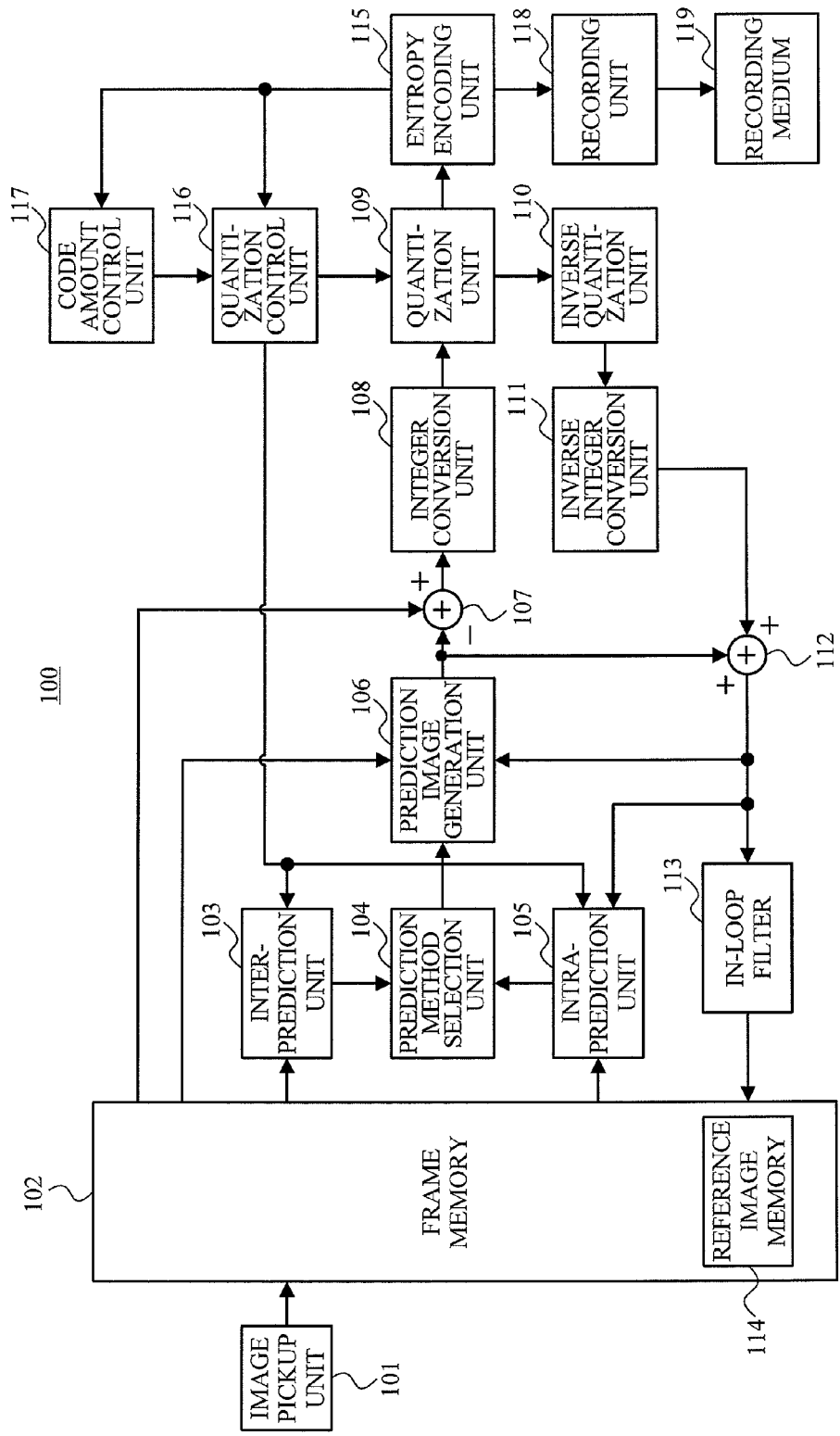
FIG. 1 is a block diagram illustrating a constructional example of an image encoding apparatus according to an embodiment of the invention.

FIG. 1 is a block diagram illustrating a constructional example of an image encoding apparatus 100 according to the first embodiment of the invention.

In FIG. 1, the image encoding apparatus 100 includes: an image pickup unit 101 including a camera unit such as lenses, image pickup sensor, and the like; and a frame memory 102 for storing moving image data which is output from the image pickup unit. The image encoding apparatus 100 further includes: an inter-prediction unit 103 for searching for a motion vector by a difference between pictures; a prediction method selection unit 104 for selecting a prediction method of either an inter prediction or an intra prediction; and an intra-prediction unit 105 for selecting an intra-prediction method. Further, in order to perform a prediction encoding on an encoding block unit basis by the selected prediction method, the image encoding apparatus 100 includes: a prediction image generation unit 106; a subtractor 107; an integer conversion unit 108; a quantization unit 109; an entropy encoding unit 115; a quantization control unit 116; and a code amount control unit 117. Moreover, in order to generate a reference image which is used in the inter-prediction method, the image encoding apparatus 100 includes: an inverse quantization unit 110; an inverse integer conversion unit 111; an adder 112; and an in-loop filter 113. The image encoding apparatus 100 includes a recording unit 118 and is constructed so that a recording medium 119 can be attached thereto. The frame memory 102 has a reference image memory 114 for storing a reference image which is used in the inter prediction.

The moving image data which is output from the image pickup unit 101 is sequentially stored into the frame memory 102 in order (displaying order) of the first frame, second frame, third frame, . . . . The moving image data is sequentially read out from the frame memory 102 on a frame unit basis in order of encoding (encoding order), for example, the third frame, first frame, second frame, . . . . The frames which are read out are called an I picture, a P picture, or a B picture in accordance with the encoding method.

As an encoding method, there are: an intra encoding for effecting the encoding using only the image data in a frame; and an inter encoding for effecting the encoding additionally using the prediction between frames. As pictures which are subjected to the inter encoding, there are: a P picture to be subjected to a motion prediction between a motion compensation block unit (referred to as "MC block") and one reference frame; and a B picture to be subjected to a motion prediction between the MC block and up to two reference frames. On the other hand, a picture which is subjected to the intra encoding is an I picture. The reason why the order of the frames to be encoded differs from the order of the frames which are input is to enable a prediction (backward prediction) with not only the past frames but also future frames with respect to time to be performed.

In the case of performing the intra encoding, the image data of an encoding subject block serving as a largest encoding unit is read out of the frame memory 102 and input to the intra-prediction unit 105. The data of the pixels adjacent to the encoding subject block which is read out is also read out from the frame memory 102 and input to the intra-prediction unit 105.

The intra-prediction unit 105 performs a block matching between the encoding subject block and each of a plurality of intra-prediction image data which are generated from the data of pixels adjacent to the encoding subject block. The intra-prediction image data having the highest correlation is selected and output to the prediction method selection unit 104. When the intra-prediction image data is generated, the intra-prediction unit 105 performs the intra-prediction encoding by using reconstructed image data output from the adder 112.

In the case of the frame to be subjected to the intra encoding, the prediction method selection unit 104 always selects the intra prediction and notifies the prediction image generation unit 106 of a selection result. In accordance with the prediction method selected by the prediction method selection unit 104, the prediction image generation unit 106 generates the intra-prediction image data from the reconstructed image data which is output from the adder 112, which will be described hereinafter.

The foregoing intra-prediction image data and the image data of the encoding subject block which is read out from the frame memory 102 are input to the subtractor 107. Difference image data between the pixel values of the image of the encoding subject block and the intra-prediction image is output to the integer conversion unit 108. The integer conversion unit 108 performs an integer conversion to the difference image data of the pixel values which is input. The quantization unit 109 executes a quantization processing to the signal which is integer-converted by the integer conversion unit 108.

In the case of the frame to be subjected to the inter encoding, the image data of the encoding subject block serving as a largest encoding unit is read out from the frame memory 102 and input to the inter-prediction unit 103. The inter-prediction unit 103 reads out the reference image data from the reference image memory 114, detects a motion vector from the encoding subject image data and the reference image data, and notifies the prediction method selection unit 104 of it.

Either the inter prediction or the intra prediction can be selected every encoding subject block in dependence on a frame. Also in this case, the intra-prediction unit 105 operates as mentioned above and notifies the prediction method selection unit 104 of a result of the intra prediction. The prediction method selection unit 104 receives a result of the inter-prediction unit 103 and a result of the intra-prediction unit 105, selects the prediction method of, for example, a smaller difference value, and notifies the prediction image generation unit 106 of the selected prediction method. The subtractor 107 calculates a difference between between the pixel values of the encoding subject image and the prediction image, so that difference image data is generated. The difference image data is output to the integer conversion unit 108.

Figure 2:
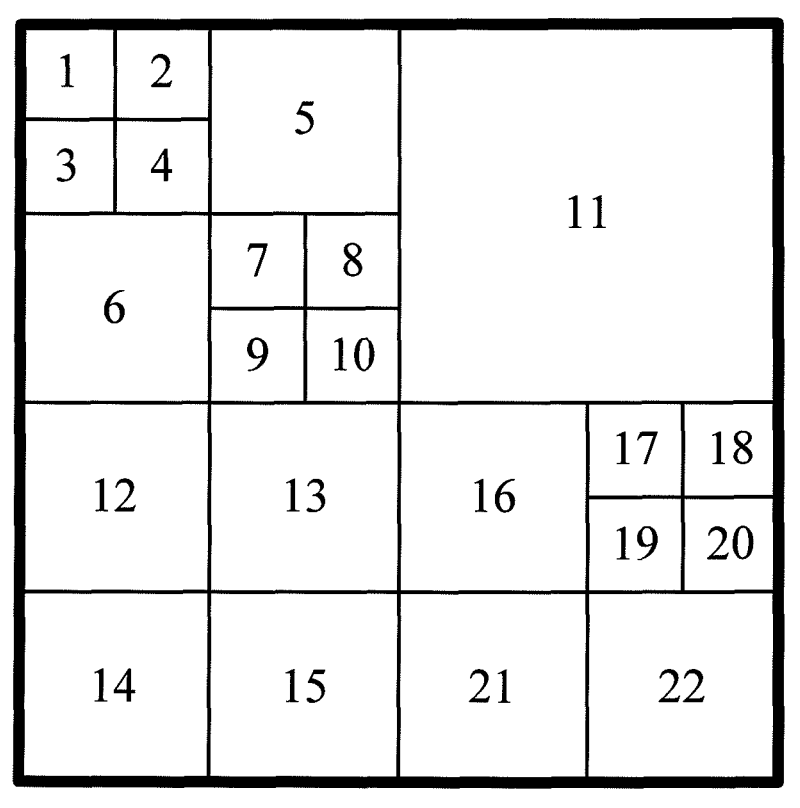

FIG. 2 is a diagram illustrating an example in which an image is block-divided on an encoding unit basis by the block serving as a largest encoding unit. The block surrounded by an outer circumference (bold line portion) of the block in FIG. 2 is a block of the maximum size of the encoding block (block of the largest encoding unit). The blocks which are obtained by finely dividing the inside of the encoding block of the maximum size are an example of the encoding blocks which are adaptively determined. The blocks of Nos. 1 to 22 become subjects of the quantization, respectively. The encoding block of the maximum size can also become the quantization subject encoding block. A plurality of encoding blocks of the largest encoding unit each including one or more such encoding blocks as mentioned above are arranged in the frame. FIG. 2 illustrates an example in which an attention is paid to one block of the largest encoding unit and each number indicates the encoding block number. In the intra prediction and the inter prediction, the block size is determined so that a difference value becomes minimum in the block of the largest encoding unit. However, since block discrimination information is added if the number of blocks is large, a header information amount is taken into account to determine the block size. For example, in an arbitrary block A obtained by dividing the block, now assuming that a difference value is set to D, a quantization coefficient is set to Q, and a header information amount is set to I, an evaluation value H of the block A is obtained by the following equation.

$$H = D/Q + I$$

The block size is determined so that a total value of the evaluation values H of the respective blocks becomes minimum.

However, the embodiment is not limited to the division method of the block as illustrated in FIG. 2 but another division method may be used.

Returning to FIG. 1, the operation of the image encoding apparatus according to the embodiment will be described.

The entropy encoding unit 115 entropy encodes an integer conversion coefficient which is quantized by the quantization unit 109 and outputs as a stream to the recording unit 118. The quantization coefficient in the quantization unit 109 is calculated by the quantization control unit 116 by using the following data such as coefficient, code amount, and the like.

That is, data are: an initial quantization coefficient or the quantization coefficient used in the previous block; the encoding block size which is determined in the prediction method selection unit 104; the code amount which is generated in the entropy encoding unit 115; the target code amount which is set from the code amount control unit 117; and the like.

Figure 3A:
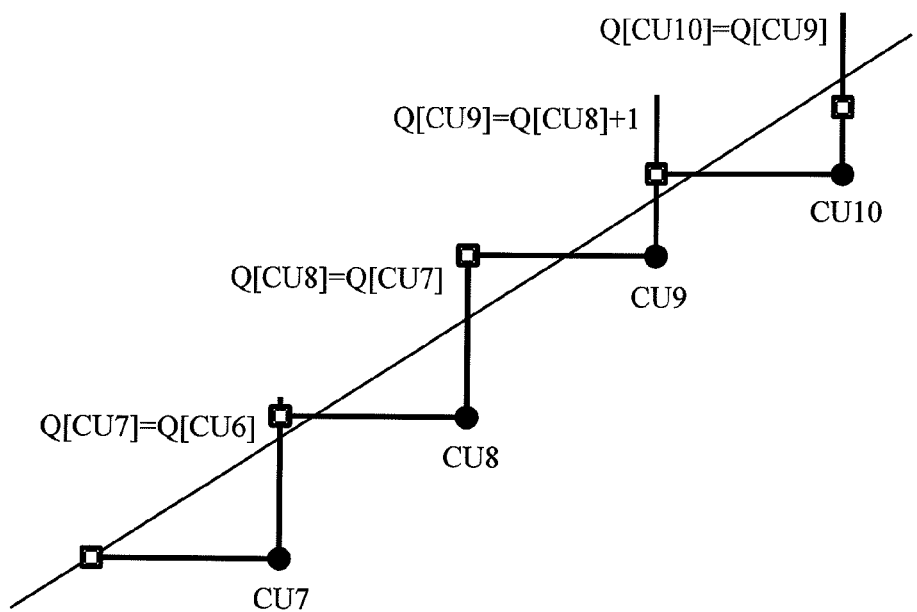
FIGS. 3A and 3B are diagrams conceptually illustrating relations among a target code amount, a quantization coefficient, and a generated code amount in code amount control.

FIG. 3A is a diagram illustrating relations among the target code amount, quantization coefficient, and generated code amount in each block code amount control.

In the diagram, a solid black circle (●) indicates an added-up code amount in the previous block address. The generated code amount at the position of the solid black circle is shown by a square (□). An oblique line is drawn between the added-up code amount and the target picture code amount. CU denotes a coding unit.

The block target code amount can be obtained by

{(target picture code amount)−(added-up code amount)}/(remaining block corresponding size)

The remaining block corresponding size is a value obtained by converting an unencoded block size into a block size of the current block. The unencoded block size can be obtained from the current encoding position (for example, posA in FIG. 7, which will be described hereinafter) and is encoding information regarding the encoding block. Such information is information which is suitably stored into a memory (not shown) of the quantization control unit 116, a memory of a control unit (not shown) for controlling the whole encoding apparatus, or the like and can be read out in accordance with necessity.

The encoding is performed on a block unit basis and a difference between the block target code amount and the block generated code amount becomes a block encoding error err.

At this time, a quantization coefficient Qp is obtained by the following equation (1).

$$Qp = Q + \Sigma err * \alpha \quad (1)$$

where, α is an arbitrary value.

Although the quantization coefficient can be finely changed to raise control sensitivity, since a quantization distortion is caused, it is also necessary to weaken the sensitivity. This is adjusted by α. The larger the value of α is, the higher the control sensitivity is.

FIG. 3A is a diagram illustrating relations among target code amounts, quantization coefficients, and generated code amounts in CU7 to CU10 in the case where the quantization coefficient is determined and the encoding is performed every block as mentioned above.

Figure 3B:
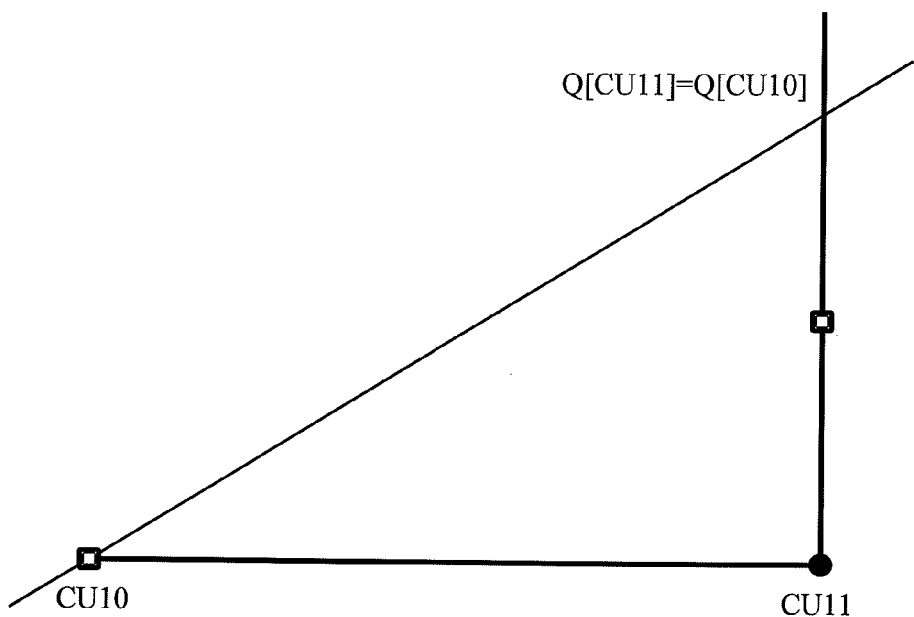

FIG. 3B is a diagram illustrating relations among target code amounts, quantization coefficients, and generated code amounts in a next encoding block CU11 in FIG. 3A. This diagram illustrates the relations in the case where the quantization coefficient of CU10 is succeeded and CU11 is encoded. As illustrated in the diagram, since the block sizes differ, a code amount error increases.

Figure 4:
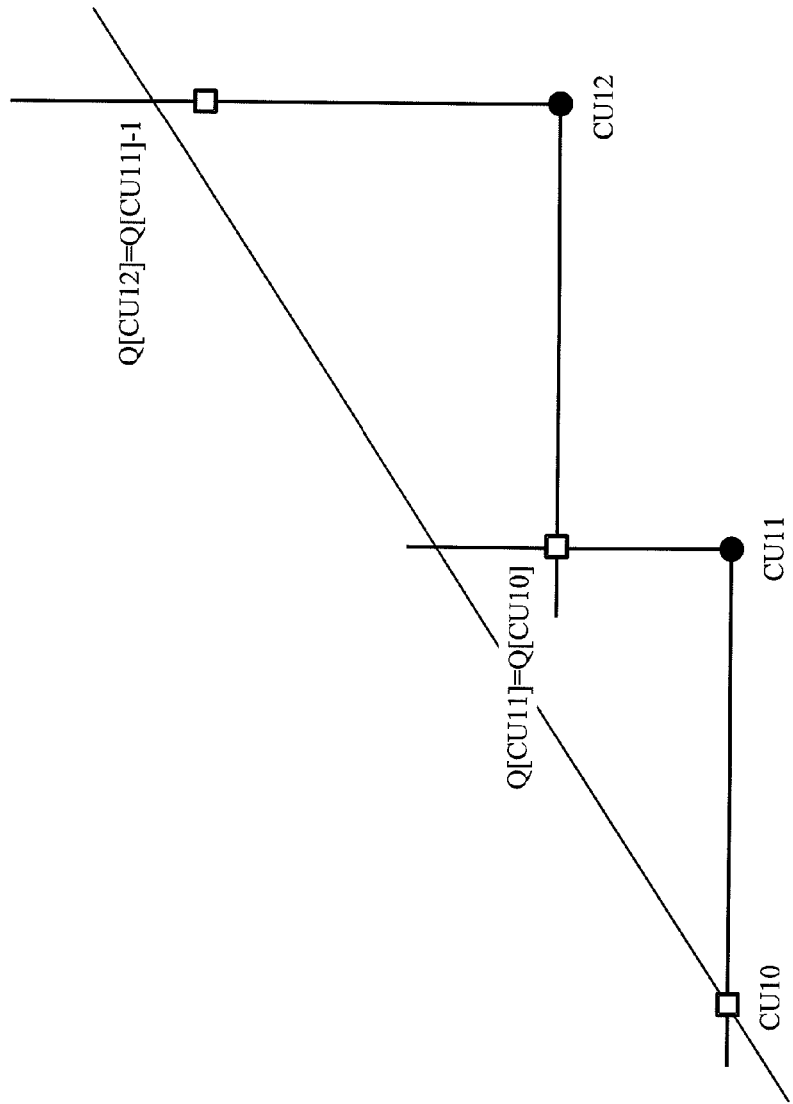
FIG. 4 is a diagram conceptually illustrating relations among a target code amount, a quantization coefficient, and a generated code amount in the case where an encoding block size is changed for the encoding control illustrated in FIG. 3.

FIG. 4 is a diagram illustrating the generated code amount (□) in the case where the encoding block size is changed in FIG. 3B. Although the target code amount and the generated code amount of the block are largely separated by the quantization coefficient in the large block, by decreasing the block size, the quantization coefficient in the next block CU11 can be changed to Q[CU12] and the code amount error can be suppressed.

Figure 5:
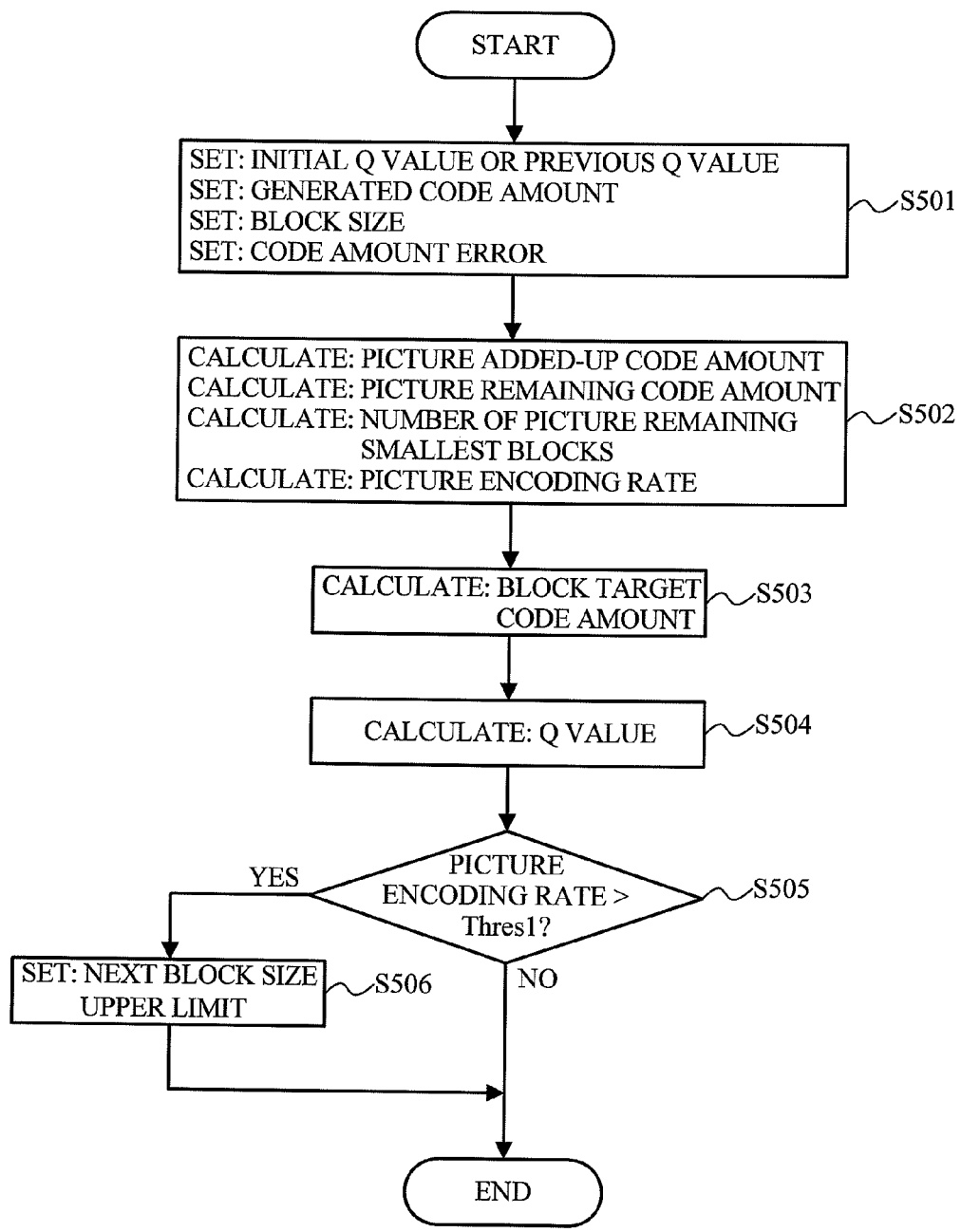
FIG. 5 is a flowchart for the control operation according to the first embodiment of the invention which is executed by a quantization control unit of the encoding apparatus in FIG. 1.

FIG. 5 is a flowchart for the quantization control operation according to the embodiment which is executed by the quantization control unit 116. Processings shown in this flowchart are realized by a method whereby the CPU of the quantization control unit 116 or the CPU of the control unit (not shown) for controlling the whole image encoding apparatus in FIG. 1 executes a control program.

The operation of the quantization control unit 116 will be described with reference to the flowchart shown in FIG. 5. First, encoding information regarding the current encoding block is set (S501). In the embodiment, an initial quantization coefficient serving as an initial value or the last quantization coefficient of the picture of the same picture type which is encoded before, the generated code amount of the previous block, the current block size, and the code amount error are obtained and set. Those data is suitably stored in the memory (not shown) of the quantization control unit 116, the memory of the control unit (not shown) for controlling the whole image encoding apparatus and is read out in accordance with necessity.

On the basis of the set encoding information and other encoding information (such as position information and the like) of the current encoding block, information for code amount control are calculated (S502). In the embodiment, by adding up the generated code amounts of the blocks up to the previous block, a picture added-up code amount is calculated. Further, by subtracting the picture added-up code amount from the picture target code amount, a picture remaining code amount is calculated. The number of "picture remaining smallest blocks" (which will be defined hereinafter) in the case where the inside of the picture is fully filled with encoding blocks of the smallest block size is calculated. By dividing the number of "picture remaining smallest blocks" by the number of "picture whole smallest blocks" (which will be defined hereinafter), a picture encoding rate (encoding rate of the current encoding subject frame) is also calculated (S502). Data which is necessary for those arithmetic operations and is not set in S501 and results of the arithmetic operations are also suitably stored and are read out in accordance with necessity in the control construction of the encoding apparatus in a manner similar to the case of step S501. That is, "smallest block size" denotes the smallest block size among a plurality of selectable block sizes. "the number of picture remaining smallest blocks" denotes the number of unencoded blocks in the picture in the case where the inside of the picture is fully filled with the encoding blocks of the smallest block size. "the number of picture whole smallest blocks" denotes the number of whole encoding blocks in the picture in the case where the inside of the picture is fully filled with the encoding blocks of the smallest block size. Therefore, those information can be obtained from the size of encoding block, the size of picture, and the current encoding position (encoding information regarding the encoding block).

A block target code amount is calculated from the picture remaining code amount, the number of picture remaining smallest blocks, and the block size (S503) to calculate a quantization coefficient Q value (S504).

Subsequently, whether or not the picture encoding rate is larger than a predetermined threshold value (Thres1) is determined (S505).

When the picture encoding rate is larger than the threshold value Thres1, an upper limit of the size of next block is changed to set a new value, thereby inhibiting that a block size which is equal to or larger than the upper limit is selected in the inter-prediction unit 103 and the intra-prediction unit 105 (S506). For example, control is made so as not to generate a block larger than (16×16).

As mentioned above, when the picture encoding rate is larger than the threshold value (the number of picture remaining smallest blocks is large), if the encoding error increases in the large block, in order to suppress the code amount error, the code amount will be required to be suppressed by largely changing the quantization coefficient. Therefore, in the embodiment, control is made in such a manner that the upper limit of the block size is changed and the code amount error is suppressed without generating the large block.

However, the upper limit of the block size may be a size other than (16×16) in the description.

Returning to FIG. 1, the operation of the image encoding apparatus according to the embodiment will be further described.

The integer conversion coefficient which is quantized by the quantization unit 109 is also input to the inverse quantization unit 110. The inverse quantization unit 110 inversely quantizes the integer conversion coefficient which is input. The inverse integer conversion unit 111 executes an inverse integer conversion processing to the integer conversion coefficient which is inversely quantized.

The data which is inversely integer converted and the intra-prediction image data which is generated by the prediction image generation unit 106 are input to the adder 112 and added. Data after the addition becomes decoded reconstructed image data and is input to the foregoing prediction image generation unit 106, to be used for generation of the intra-prediction image data. A processing for reducing the encoding distortion is executed to the reconstructed image data by the in-loop filter 113. Resultant data is stored into the reference image memory 114 as reference image data which is used for an inter encoding, which will be described hereinafter.

The recording unit 118 records a stream which is output from the entropy encoding unit 115 onto the recording medium 119.

As mentioned above, according to the embodiment, by providing a maximum size of the encoding block, the code amount error can be suppressed and the image encoding apparatus which makes the optimum quantization control can be provided.

Subsequently, the second embodiment of the invention will be described with reference to FIGS. 6 and 7.

Figure 6:
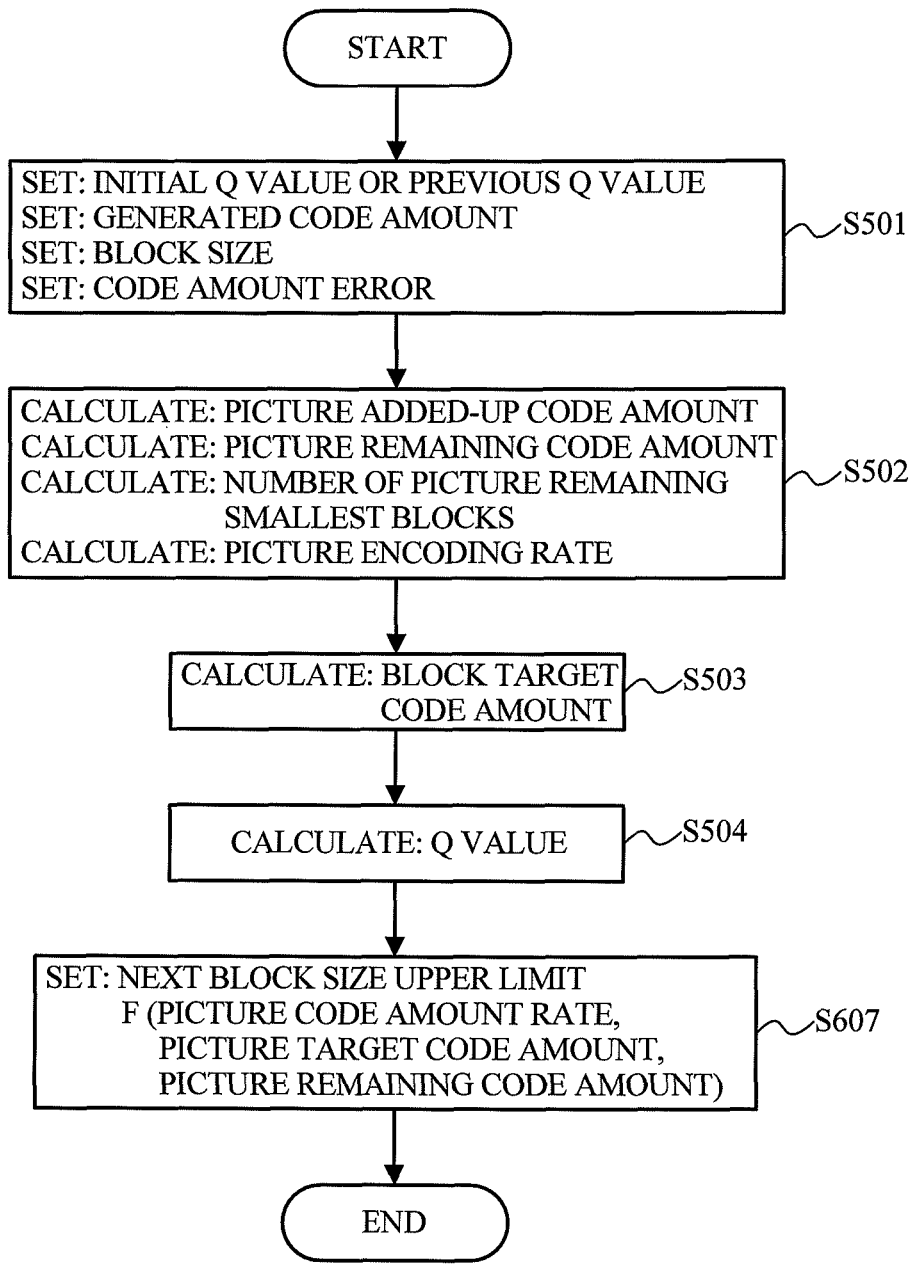
FIG. 6 is a flowchart for the control operation according to the second embodiment of the invention which is executed by the quantization control unit.

FIG. 6 illustrates a flowchart for the control operation of the quantization control unit 116 according to the present embodiment. In the flowchart, the same processings as those in the first embodiment (FIG. 5) are designated by the same step numbers and their description is omitted here unless otherwise necessary in particular. Since a main construction of the image encoding apparatus of the present embodiment is similar to that of the first embodiment, its description is also omitted here.

In the control operation of the present embodiment, portions different from those in the first embodiment will be described hereinbelow.

In a manner similar to the first embodiment, after information necessary for the quantization control is set and arithmetic operations are performed, in step S607, an encoding error rate per picture unit is calculated from the picture encoding rate, the picture target code amount, and the picture remaining code amount and a maximum block size is determined on the basis of the code amount error rate.

Figure 7:
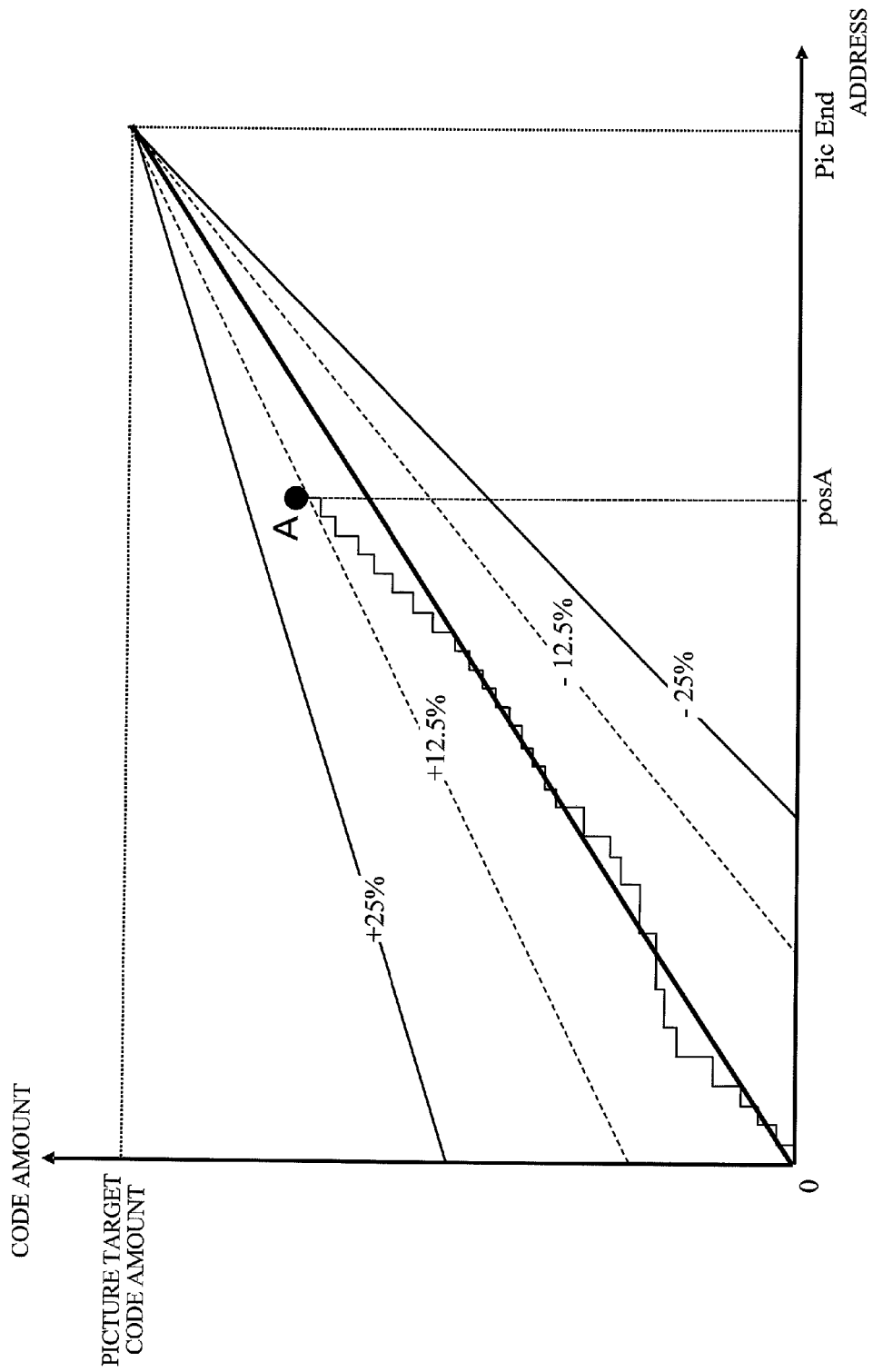
FIG. 7 is a graph illustrating a relation between a picture target code amount and a code amount error rate in the operation in FIG. 6.

FIG. 7 is a graph illustrating the picture target code amount and the code amount error rate. In the graph, a point A indicates a current position of the encoding. A coordinate posA of an axis of abscissa of the point A provides a picture encoding rate as an interior division point of a distance from an origin O to a point Pic End. A coordinate of an axis of ordinate provides a picture added-up code amount (picture target code amount−picture remaining code amount). Therefore, the position of the point A can be specified from a current intra encoding rate and an intra remaining code amount of the frame. If the position of the point A can be known (from the encoding information regarding the encoding block), a code amount error rate of the frame can be calculated as will be described hereinafter.

In the graph, a bold solid line connecting a picture target code amount at the last position of the picture to be encoded and the origin O becomes a line showing a target added-up code amount at the time when a code amount is uniformly given to the encoding block of each smallest block size. A difference between the line showing the target added-up code amount and an actual added-up code amount (zigzag line) becomes a code amount error. A code amount error rate can be calculated by using the target code amount, the target added-up code amount, and the code amount error.

(code amount error)=(actual added-up code amount)−
(target added-up code amount)

(code amount error rate)=(code amount error)/(target
code amount)

In the graph, a reason why a length of slide to the horizontal direction of the zigzag line showing the actual added-up code amount is that the encoding block size differs. A vertical transition occurs by the generated code amount.

There is a possibility that the actual added-up code amount at the point A in the graph is largely deviated from the picture target code amount since the code amount error rate exceeds a predetermined error rate (broken line of +12.5%). Therefore, the maximum size of the encoding block is decreased to finely perform the quantization control, and the code amount is finely controlled.

When the code amount error rate exceeds +25% (thin solid line of +25%), the maximum size of the encoding block is further decreased.

For example, when there is no restriction, the maximum size of the encoding block is decreased step by step as the code amount error rate increases in such a manner that the block size is set to a block of (64×64) pixels, is set to a block of (32×32) pixels at +12.5%, and is set to a block of (16×16) pixels at +25%.

On the contrary, even when the code amount error rate indicates a minus value, control can be made in such a manner that the maximum size of the encoding block is changed so that the actual added-up code amount approaches the target added-up code amount.

In the present embodiment, the relation between the code amount error rate and the maximum size to be changed is not limited to the values mentioned above. Changing conditions and the maximum block size may be suitably set by other numerical values.

As described above, in the present embodiment, the code amount error rate is calculated in step S607 in accordance with the calculation of the quantization coefficient Q and a maximum size of the block size in the next encoding is determined in accordance with a calculation result. By this method, the code amount error can be also suppressed.

As mentioned above, according to the present embodiment, by changing the maximum size of the quantization block step by step in accordance with the code amount error rate, the code amount error can be suppressed, and the image encoding apparatus which can perform the optimum quantization control can be provided.

The functions of the processings shown in FIGS. 5 and 6 are realized by a method whereby a program for realizing the functions of the processings is read out from the memory (not shown) and the CPU or the like of the quantization control unit executes the program as mentioned above. However, the invention is not limited to such a method but all or a part of the functions of the processings shown in FIGS. 5 and 6 may be realized by dedicated hardware. The foregoing memory may be constructed by a computer-readable and writable recording medium. For example, as such a recording medium, there is a magnetooptic disk device, a non-volatile memory such as a flash memory or the like, a read only recording medium such as a CD-ROM or the like, a volatile memory other than a RAM, or a recording medium constructed by a combination of them.

The above processings may be realized by a method whereby the program for realizing the functions of the processings shown in FIGS. 5 and 6 is recorded into a computer-readable recording medium and the program recorded in the recording medium is read out and stored into a computer system and is executed thereby. It is assumed that "computer system" mentioned here incorporates the OS and hardware such as peripheral equipment or the like. Specifically speaking, it also incorporates a case where the program which is read out from a storage medium is written into a memory provided for a function expanding board inserted in a computer or a function expanding unit connected to the computer. In this case, after the program is written, a CPU or the like provided for the function expanding board or function expanding unit executes a part or all of actual processings on the basis of instructions of the program, and the functions of the embodiments mentioned above are realized by those processings.

"computer-readable recording medium" denotes a portable medium such as flexible disk, magnetooptic disk, ROM, CD-ROM, or the like or a storage device such as a hard disk built in the computer system or the like. Further, "computer-readable recording medium" incorporates a volatile memory (RAM) in the computer system serving as a server or a client in the case where the program has been transmitted by a network such as Internet or the like or through a communication line such as a telephone line or the like. It is assumed that a medium which holds the program for a predetermined time is also incorporated in "computer-readable recording medium".

The program may be transmitted from the computer system in which the program has been stored in the storage device or the like to another computer system through a transmission medium or by a transmission wave in the transmission medium. "transmission medium" for transmitting the program denotes a medium having a function for transmitting information such as network (communication network) like Internet or the like or communication line (communication wire) like a telephone line or the like.

The program may be a program for realizing a part of the functions mentioned above. Further, the program may be what is called a difference file (difference program) in which the functions mentioned above can be realized by a combination with the program which has already been recorded in the computer system.

A program product such as a computer-readable recording medium or the like in which the foregoing program has been recorded can be also applied as an embodiment of the invention. The foregoing program, recording medium, transmission medium, and program product are incorporated in the purview of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-138666 filed on Jun. 20, 2012, which is hereby incorporated by reference herein in its entirety.

What is claimed is:

1. An image encoding apparatus for encoding image data including a plurality of frames, comprising:
    an obtaining unit configured to obtain the image data;
    a prediction unit configured to determine a size of an encoding block of an encoding subject frame on the basis of the obtained image data;
    an encoding unit configured to encode the obtained image data on an encoding block unit basis in accordance with the determined encoding block size; and
    a code amount control unit configured to control a code amount of the encoding block whose size is determined by the prediction unit, based on encoding information of a current encoding block, whose size is determined by the prediction unit and an encoding block encoded by the encoding unit before the current encoding block,
    wherein the code amount control unit arithmetically operates predetermined encoding information of the encoding subject frame on the basis of the encoding information and restricts the encoding block size which is to be determined by the prediction unit, in accordance with the predetermined encoding information which is arithmetically operated,
    wherein the code amount control unit calculates a code amount error rate from a generated code amount and a target code amount of the encoding subject frame and changes a maximum size of the encoding block size which is to be determined by the prediction unit, in accordance with the calculated code amount error rate.

2. The image encoding apparatus according to claim 1, wherein the code amount control unit calculates an encoding rate of the encoding subject frame as the predetermined encoding information, changes a maximum size of the encoding block size which is to be determined by the prediction unit if the encoding rate is larger than a predetermined threshold value, and inhibits the prediction unit from determining the block size which is equal to or larger than the changed maximum size.

3. The image encoding apparatus according to claim 2, wherein the code amount control unit calculates the encoding rate on the basis of information of an unencoded block, which is obtained from the encoding information of the current encoding block, and a predetermined block size.

4. The image encoding apparatus according to claim 1, wherein if the calculated code amount error rate exceeds a predetermined error rate, the code amount control unit decreases a maximum size of the encoding block size which is to be determined by the prediction unit.

5. The image encoding apparatus according to claim 4, wherein as the calculated code amount error rate increases in excess of the predetermined error rate, the code amount control unit decreases, step by step, the maximum size of the encoding block size which is to be determined by the prediction unit.

6. The image encoding apparatus according to claim 1, wherein the code amount control unit adds up a generated code amount in the encoding block encoded by the encoding unit, calculates a remaining code amount from a target code amount of the encoding subject frame and the add-up generated code amount, and determines a block target code amount and a quantization coefficient on the basis of the remaining code amount.

7. The image encoding apparatus according to claim 1, wherein the prediction unit determines the encoding block size on the basis of a difference value of a pixel according to either an intra prediction or an inter prediction.

8. The image encoding apparatus according to claim 1, wherein the encoding unit encodes the encoding subject frame of the image data on the encoding block unit basis in accordance with either an intra prediction or an inter prediction.

9. An image encoding apparatus for encoding image data including a plurality of frames, comprising:
   an obtaining unit configured to obtain the image data;
   a prediction unit configured to determine a size of an encoding block of an encoding subject frame on the basis of the obtained image data;
   an encoding unit configured to encode the obtained image data on an encoding block unit basis in accordance with the determined encoding block size; and
   a code amount control unit configured to control a code amount of the encoding block whose size is determined by the prediction unit, based on encoding information of a current encoding block whose size is determined by the prediction unit and an encoding block encoded by the encoding unit before the current encoding block,
   wherein the code amount control unit adds up a generated code amount of each encoding block encoded by the encoding unit before the current encoding block in the encoding subject frame and restricts the encoding block size which is to be determined by the prediction unit, in accordance with the added-up generated code amount,
   wherein the code amount control unit calculates an encoding rate of the encoding subject frame on the basis of the added-up generated code amount and a target code amount for the encoding subject frame, changes a maximum size of the encoding block size which is to be determined by the prediction unit if the encoding rate is larger than a predetermined threshold value, and inhibits the prediction unit from determining the block size which is equal to or larger than the changed maximum size.

10. The image encoding apparatus according to claim 9, wherein the code amount control unit changes a maximum size of the encoding block size which is determined by the prediction unit and inhibits the prediction unit from determining the block size which is equal to or larger than the changed maximum size.

11. The image encoding apparatus according to claim 9, wherein the code amount control unit calculates the encoding rate on the basis of information of an unencoded block, which is obtained from the encoding information of the current encoding block, and a predetermined block size.

12. The image encoding apparatus according to claim 9, wherein the code amount control unit calculates a code amount error rate from the added-up generated code amount and the target code amount and changes the maximum size of the encoding block size which is to be determined by the prediction unit, in accordance with the calculated code amount error rate.

13. The image encoding apparatus according to claim 12, wherein if the calculated code amount error rate exceeds a predetermined error rate, the code amount control unit decreases the maximum size of the encoding block size which is to be determined by the prediction unit.

14. The image encoding apparatus according to claim 13, wherein as the calculated code amount error rate increases in excess of the predetermined error rate, the code amount control unit decreases, step by step, the maximum size of the encoding block size which is to be determined by the prediction unit.

15. A control method of an image encoding apparatus including an obtaining unit configured to obtain image data including a plurality of frames, a prediction unit configured to determine a size of an encoding block of an encoding subject frame of the image data, and an encoding unit configured to encode the obtained image data on an encoding block unit basis in accordance with the determined encoding block size, the control method comprising:
   a code amount control step of controlling a code amount of the encoding block whose size is determined by the prediction unit, based on encoding information of a current encoding block whose size is determined by the prediction unit and an encoding block encoded by the encoding unit before the current encoding block,
   wherein the code amount control step includes a step of arithmetically operating predetermined encoding information of the encoding subject frame on the basis of the encoding information and restricting the encoding block size which is to be determined by the prediction unit, in accordance with the predetermined encoding information which is arithmetically operated,
   wherein in the code amount control step, a code amount error rate is calculated from a generated code amount and a target code amount of the encoding subject frame and a maximum size of the encoding block size, which is to be determined by the prediction unit is changed in accordance with the calculated code amount error rate.

16. A control method of an image encoding apparatus including an obtaining unit configured to obtain image data including a plurality of frames, a prediction unit configured to determine a size of an encoding block of an encoding subject frame of the image data, and an encoding unit configured to encode the obtained image data on an encoding block unit basis in accordance with the determined encoding block size, the control method comprising:
   a code amount control step of controlling a code amount of the encoding block whose size is determined by the prediction unit, based on encoding information of a current encoding block whose size is determined by the prediction unit and an encoding block encoded by the encoding unit before the current encoding block,
   wherein the code amount control step includes a step of adding up a generated code amount of each encoding block encoded by the encoding unit before the current encoding block in the encoding subject frame and restricting the encoding block size which is to be determined by the prediction unit in accordance with the added-up generated code amount,
   wherein in the code amount control step, an encoding rate of the encoding subject frame is calculated on the basis of the added-up generated code amount and a target code amount for the encoding subject frame, a maximum size of the encoding block size, which is to be determined by the prediction unit, is changed if the encoding rate is larger than a predetermined threshold value, and the prediction unit is inhibited from determining the block size which is equal to or larger than the changed maximum size.

17. A non-transitory computer-readable storage medium storing a program for causing a computer to execute a control method of an image encoding apparatus including an obtaining unit configured to obtain image data including a plurality of frames, a prediction unit configured to determine a size of an encoding block of an encoding subject frame of the image data, and an encoding unit configured to encode the obtained image data on an encoding block unit basis in accordance with the determined encoding block size, the control method comprising:

- a code amount control step of controlling a code amount of the encoding block, whose size is determined by the prediction unit, based on encoding information of a current encoding block whose size is determined by the prediction unit, and an encoding block encoded by the encoding unit before the current encoding block,
- wherein the code amount control step includes a step of arithmetically operating predetermined encoding information of the encoding subject frame on the basis of the encoding information and restricting the encoding block size which is to be determined by the prediction unit, in accordance with the predetermined encoding information which is arithmetically operated,
- wherein in the code amount control step, a code amount error rate is calculated from a generated code amount and a target code amount of the encoding subject frame and a maximum size of the encoding block size, which is to be determined by the prediction unit, is changed in accordance with the calculated code amount error rate.

18. A non-transitory computer-readable storage medium storing a program for causing a computer to execute a control method of an image encoding apparatus including an obtaining unit configured to obtain image data including a plurality of frames, a prediction unit configured to determine a size of an encoding block of an encoding subject frame of the image data, and an encoding unit configured to encode the obtained image data on an encoding block unit basis in accordance with the determined encoding block size, the control method comprising:

- a code amount control step of controlling a code amount of the encoding block, whose size is determined by the prediction unit, based on encoding information of a current encoding block, whose size is determined by the prediction unit, and an encoding block encoded by the encoding unit before the current encoding block,
- wherein the code amount control step includes a step of adding up a generated code amount of each encoding block encoded by the encoding unit before the current encoding block in the encoding subject frame and restricting the encoding block size which is to be determined by the prediction unit in accordance with the added-up generated code amount,
- wherein in the code amount control step, an encoding rate of the encoding subject frame is calculated on the basis of the added-up generated code amount and a target code amount for the encoding subject frame, a maximum size of the encoding block size, which is to be determined by the prediction unit, is changed if the encoding rate is larger than a predetermined threshold value, and the prediction unit is inhibited from determining the block size which is equal to or larger than the changed maximum size.

* * * * *